United States Patent
Coward et al.

(10) Patent No.: US 11,435,229 B2
(45) Date of Patent: Sep. 6, 2022

(54) HYPERSPECTRAL IMAGING SYSTEMS

(71) Applicant: SA Photonics, Inc., Los Gatos, CA (US)

(72) Inventors: James F. Coward, Washougal, WA (US); David Alan Pechner, San Jose, CA (US); Gregory Mitchell, Elk Grove, CA (US); Ji Li, San Jose, CA (US)

(*) Notice: Subject to any disclaimer, the term of this patent is extended or adjusted under 35 U.S.C. 154(b) by 0 days.

(21) Appl. No.: 16/662,886

(22) Filed: Oct. 24, 2019

(65) Prior Publication Data

US 2020/0264047 A1     Aug. 20, 2020

Related U.S. Application Data

(60) Provisional application No. 62/750,162, filed on Oct. 24, 2018.

(51) Int. Cl.
   *G01J 3/28* (2006.01)
   *G01J 3/10* (2006.01)
   *G06T 7/521* (2017.01)

(52) U.S. Cl.
   CPC ............ *G01J 3/108* (2013.01); *G01J 3/2823* (2013.01); *G06T 7/521* (2017.01); *G01J 2003/2826* (2013.01); *G06T 2207/10036* (2013.01); *G06T 2207/10048* (2013.01)

(58) Field of Classification Search
   CPC .... G01J 3/02; G01J 3/28; G01J 3/2803; G01J 3/10; G01J 3/2823

USPC .......................................................... 356/326
   See application file for complete search history.

(56) References Cited

U.S. PATENT DOCUMENTS

| | | | |
|---|---|---|---|
| 2007/0058038 A1* | 3/2007 | David | G01S 17/18 348/135 |
| 2008/0029711 A1* | 2/2008 | Viellerobe | G01N 21/6428 250/459.1 |
| 2011/0032605 A1* | 2/2011 | Kliner | H01S 3/11 359/344 |
| 2012/0292531 A1* | 11/2012 | Grudinin | G01N 21/65 250/459.1 |
| 2019/0302083 A1* | 10/2019 | Lalovic | G01J 3/04 |

OTHER PUBLICATIONS

A. Berk, et al., "Modtran: A Moderate Resolution Model for Lowtran", Spectral Sciences Inc., Technical rept. May 1, 1986-May 11, 1987.

(Continued)

*Primary Examiner* — Md M Rahman
(74) *Attorney, Agent, or Firm* — Knobbe, Martens, Olson & Bear, LLP

(57) ABSTRACT

Shortwave infrared (SWIR) hyperspectral imaging (HSI) systems comprise a supercontinuum laser source configured to illuminate objects and a receiver comprising a spectrometer configured to receive light reflected from the objects. In some cases, hyperspectral images can be created by raster scanning of the source/receiver across a scene. The supercontinuum laser source provides active illumination to allow collection of hyperspectral imagery during day (including overcast conditions) and night. Additionally, the hyperspectral imaging systems can use range-gated imaging.

24 Claims, 7 Drawing Sheets

(56) References Cited

OTHER PUBLICATIONS

J. Meola, A. Absi, A. I. Ifarraguerri, M. N. Islam, L. M. Peterson, K. Ke, and M. J. Freeman, "Tower Testing of a 64W shortwave infrared supercontinuum laser for use as a hyperspectral imaging illuminator," Proc. SPIE 9088, pp. 90881A-1-90881A-12, 2014.

J. Meola, A. Absi, J. D. Leonard, A. I. Ifarraguerri, M. N. Islam, V. V. Alexander, and J. A. Zadnik, "Modeling, development, and testing of a shortwave infrared supercontinuum laser source for use in active hyperspectral imaging," Proc. SPIE 8743, pp. 87431D-87431D-12, 2013.

V. V. Alexander, Z. Shi, M. N. Islam, K. Ke, G. Kalinchenko, M. J. Freeman, A. Ifarraguerri, J. Meola, A. Absi, J. Leonard, J. A. Zadnik, A. S. Szalkowski, and G. J. Boer, "Field trial of active remote sensing using a high-power short-wave infrared supercontinuum laser," Appl. Opt. 52, pp. 6813-6823, Sep. 2013.

V. V. Alexander, Z. Shi, M. N. Islam, K. Ke, M. J. Freeman, A. Ifarraguerri, J. Meola, A. Absi, J. Leonard, J. Zadnik, A. S. Szalkowski, and G. J. Boer, "Power scalable 25w supercontinuum laser from 2 to 2.5um with near-diffraction-limited beam and low output variability," Opt. Lett. 38, pp. 2292-2294, Jul. 2013.

Orchard, D., et al., "White Light Lasers for Remote Sensing," Proceedings of SPIE, vol. 7115, 711506 (Oct. 6, 2008).

Powers and Davis, "Spectral LADAR: Active Range-resolved Three-dimensional Imaging Spectroscopy," Applied Optics, vol. 51, No. 10, Apr. 2012.

sbir.gov, American Seed Fund, Department of Defense, "Topographic/HSI Active Transceiver (TOPHAT)" | SBIR.gov, Award Information (includes Abstract), Award Year 2014, https://www.sbir.gov/node/689015, printed Apr. 6, 2022.

sbir.gov, American Seed Fund, Department of Defense, Air Force, "Topographic/HSI Active Transceiver (TOPHAT)" SBIR.gov. (Solicitation), Award Year 2014, https://www.sbir.gov/node/561444, printed Apr. 6, 2022.

SBIR Solicitation AF141-178 "Topographic/HSI Active Transceiver (TOPHAT)," 2014.

* cited by examiner

HYPERSPECTRAL IMAGING SYSTEMS

CROSS-REFERENCE TO RELATED APPLICATIONS

This application claims the benefit of priority under 35 U.S.C. § 119(e) of U.S. Provisional Patent Application No. 62/750,162, filed on Oct. 24, 2018 and titled "HYPERSPECTRAL IMAGING SYSTEMS," which is hereby incorporated by reference herein in its entirety for all purposes.

STATEMENT REGARDING FEDERALLY SPONSORED R&D

This invention was made with government support under U.S. Government contract FA8650-15-C-1857 awarded by AFRL/RQKSE. The government may have certain rights in the invention.

BACKGROUND

Field

This application generally relates to the field of imaging and hyperspectral imaging in particular.

DESCRIPTION OF THE RELATED TECHNOLOGY

Hyperspectral imaging (HSI) systems have demonstrated value for intelligence, surveillance, and reconnaissance (ISR) tasks, such as material identification and target detection using spectral information. HSI systems may be configured to image over a wide bandwidth such as over an optical bandwidth of at least 100 nm. Visible-to-shortwave infrared (V-SWIR) HSI systems can operate in a wavelength region between 0.4 μm-2.5 μm. Such V-SWIR HSI systems can be configured to operate by receiving and analyzing/measuring solar radiation reflected from objects in a scene. In such cases, the operability of such V-SWIR HSI systems may be limited to conditions with adequate solar illumination. Accordingly, such V-SWIR HSI systems may not be capable of operation at night and/or when solar illumination levels are low, such as, for example at dawn or dusk, and/or under cloudy or overcast conditions. Thermal HSI systems operate by receiving and analyzing/measuring SWIR or mid- to far infrared radiation (e.g., having wavelengths greater than 2.5 μm) reflected from objects in a scene. Thus, thermal HSI systems can be operated during the day and night and/or under a variety of weather conditions. However, thermal HSI systems can be expensive and have greater size-weight-and-power (SWaP) requirements as compared to V-SWIR HSI systems in some cases. Additionally, various materials-of-interest (MOIs) may have identifiable spectral features in the V-SWIR wavelength region but not in the wavelength region in which thermal HSI systems operate. Thus, HSI systems that are capable of operating in a wavelength region between 0.4 μm-2.5 μm during day or night and in bright or cloudy conditions are desirable.

SUMMARY

Various systems and methods discussed herein are directed towards HSI systems that can operate in the visible and/or shortwave infrared wavelength range. For example, the HSI systems discussed herein can operate in a wavelength range greater than or equal to about 400 nm and less than or equal to about 2.5 μm, greater than or equal to about 400 nm and less than or equal to about 750 nm, greater than or equal to about 500 nm and less than or equal to about 980 nm, greater than or equal to about 400 nm and less than or equal to about 1.0 μm, greater than or equal to about 650 nm and less than or equal to about 2.5 μm, greater than or equal to about 650 nm and less than or equal to about 1.3 μm, greater than or equal to about 980 nm and less than or equal to about 1.5 μm, greater than or equal to about 1.0 μm and less than or equal to about 2.5 μm, greater than or equal to about 1.3 μm and less than or equal to about 1.6 μm, or any wavelength in a wavelength range defined by any of these values.

Embodiments of the HSI system discussed herein are configured to collect data in a plurality of spectral bands in a wavelength range greater than or equal to about 400 nm and less than or equal to about 2.5 μm. For example, embodiments of HSI system discussed herein can be configured to collect data in about 20-200 spectral bands in a wavelength range greater than or equal to about 400 nm and less than or equal to about 2.5 μm The optical bandwidth of various embodiments of HSI systems can be greater than or equal to about 100 nm. The bandwidth of one or more of the plurality of spectral bands can be between about 1 nm and about 100 nm. For example, the bandwidth of one or more of the plurality of spectral bands can be greater than or equal to about 1 nm and less than or equal to about 10 nm, greater than or equal to about 5 nm and less than or equal to about 20 nm, greater than or equal to about 12 nm and less than or equal to about 25 nm, greater than or equal to about 18 nm and less than or equal to about 28 nm, greater than or equal to about 22 nm and less than or equal to about 32 nm, greater than or equal to about 25 nm and less than or equal to about 40 nm, greater than or equal to about 30 nm and less than or equal to about 50 nm, greater than or equal to about 40 nm and less than or equal to about 75 nm, greater than or equal to about 50 nm and less than or equal to about 80 nm, greater than or equal to about 70 nm and less than or equal to about 95 nm, greater than or equal to about 80 nm and less than or equal to about 100 nm. Various embodiments of HSI systems can be configured to have spectral bands with different bandwidths. Embodiments of the HSI system discussed herein can be configured to simultaneously collect data in a plurality of spectral bands in a wavelength range greater than or equal to about 400 nm and less than or equal to about 2.5 μm.

Various embodiments of the HSI system discussed herein are configured to collect data in about 80% of the wavelength range between about 400 nm and less than or equal to about 2.5 μm. Embodiments of the HSI system discussed herein are configured to simultaneously collect data in at least about 80% of the wavelength range between about 400 nm and less than or equal to about 2.5 μm. Embodiments of the HSI system discussed herein can be configured to simultaneously collect data in about 80% to 90%, 95%, 99% or 100% of the wavelength range between about 400 nm and less than or equal to about 2.5 μm or any range formed by any of these percentages.

Various embodiments of HSI systems described herein comprise a source of illumination configured to emit radiation in a wavelength range greater than or equal to about 400 nm and less than or equal to about 2.5 μm, greater than or equal to about 400 nm and less than or equal to about 750 nm, greater than or equal to about 500 nm and less than or equal to about 980 nm, greater than or equal to about 400 nm and less than or equal to about 1.0 μm, greater than or equal to about 650 nm and less than or equal to about 2.5 μm, greater than or equal to about 650 nm and less than or equal to about 1.3 µm, greater than or equal to about 980 nm and less than or equal to about 1.5 µm, greater than or equal to about 1.0 µm and less than or equal to about 2.5 µm, greater than or equal to about 1.0 µm and less than or equal to about 1.8 µm, greater than or equal to about 1.3 µm and less than or equal to about 1.6 µm, or any wavelength in a wavelength range defined by any of these values. Without any loss of generality, the spectral bandwidth of the light from the source of illumination can be broader (e.g., at least 20% broader) than the spectral bandwidth of a photodetector configured to detect light reflected from objects in the scene such that the spectral bandwidth of the light from the source of illumination overfills the photodetector. Accordingly, various embodiments of HSI systems described herein are capable of being operated under low solar illumination conditions. For example, various embodiments of HSI systems described herein are capable of being operated during daytime, nighttime, at dawn, at dusk and/or under cloudy/ overcast conditions. In various implementations of the HSI systems, the source of illumination can comprise a supercontinuum light source such as a high-power supercontinuum source. The source of illumination can be configured as a broadband source to emit light having wavelengths in a plurality of spectral bands in a wavelength range greater than or equal to about 400 nm and less than or equal to about 2.5 µm. For example, the embodiments of HSI system discussed herein can be configured to emit light in a plurality of spectral bands. For example, in various embodiments of HSI systems can comprise about 20-200 spectral bands in a wavelength range greater than or equal to about 400 nm and less than or equal to about 2.5 µm. In various embodiments, the spectral bands may be defined by the optical system and the photodetector together. In various embodiments, the width of the gap between two adjacent spectral bands in the plurality of spectral bands can be between 2% to 10% of the width of one or both adjacent spectral bands. Without any loss of generality, the tails of two adjacent spectral bands may overlap. For example, the portions of two adjacent spectral bands having an optical power less than 50% of the maximum optical power of the respective spectral bands can overlap with each other. In various embodiments, the portions of two adjacent spectral bands having an optical power less than or equal to about 40% of one of the maximum optical power of the respective spectral bands can overlap with each other. In some embodiments, the portions of two adjacent spectral bands having an optical power less than or equal to about 30% of the maximum optical power of the respective spectral bands can overlap with each other. In some embodiments, the portions of two adjacent spectral bands having an optical power less than or equal to about 20% of the maximum optical power of the respective spectral bands can overlap with each other.

As discussed above, the bandwidth of different spectral bands in the plurality of spectral bands can be about 1 nm and about 100 nm. For example, the bandwidth of one or more of the plurality of spectral bands can be greater than or equal to about 1 nm and less than or equal to about 10 nm, greater than or equal to about 5 nm and less than or equal to about 20 nm, greater than or equal to about 12 nm and less than or equal to about 25 nm, greater than or equal to about 18 nm and less than or equal to about 28 nm, greater than or equal to about 22 nm and less than or equal to about 32 nm, greater than or equal to about 25 nm and less than or equal to about 40 nm, greater than or equal to about 30 nm and less than or equal to about 50 nm, greater than or equal to about 40 nm and less than or equal to about 75 nm, greater than or equal to about 50 nm and less than or equal to about 80 nm, greater than or equal to about 70 nm and less than or equal to about 95 nm, greater than or equal to about 80 nm and less than or equal to about 100 nm.

Embodiments of the source of illumination integrated with embodiments of the HSI system discussed herein can be configured to emit light in a wide wavelength range. For example, the embodiments of the source of illumination discussed herein can be configured to simultaneously emit light in a plurality of wavelengths between about 1 micron and about 1.4 micron and/or at a plurality of wavelengths between about 1.5 and about 1.8 micron. In various embodiments, the source of illumination integrated with embodiments of the HSI system discussed herein can be configured to simultaneously emit light in a wavelength range between about 400 nm and about 2.5 microns.

Various examples of HSI imaging system are described herein such as the examples enumerated below:

Embodiment 1

A hyperspectral imaging system comprising:
a supercontinuum laser source;
transmit optics configured to propagate light output from the supercontinuum source along a transmit path towards one or more objects in a scene;
a spectrometer configured to receive light from the one or more objects in the scene; and
electronics configured to generate a spectral image based on light received from said spectrometer.

Embodiment 2

The hyperspectral imaging system of Embodiment 1, wherein the supercontinuum laser comprises a seed optical source and an optical non-linear medium.

Embodiment 3

The hyperspectral imaging system of Embodiment 2, wherein the seed optical source comprises a pulsed laser.

Embodiment 4

The hyperspectral imaging system of Embodiment 1-3, wherein the supercontinuum laser comprises an optical fiber.

Embodiment 5

The hyperspectral imaging system of any of the above Embodiments, wherein the supercontinuum laser source is configured to output light in the near-infrared wavelength region.

Embodiment 6

The hyperspectral imaging system of any of the above Embodiments, wherein the supercontinuum laser source is configured to output light in a wavelength range between about 1 micron and about 1.8 micron.

Embodiment 7

The hyperspectral imaging system of any of the above Embodiments, wherein the supercontinuum laser source is configured to output light in at least 90% of the wavelengths in the wavelength range between about 1 micron and about 1.8 micron.

Embodiment 8

The hyperspectral imaging system of any of the above Embodiments, wherein a bandwidth of the light output from the supercontinuum laser source is greater than or equal to 20 nm and less than or equal to about 800 nm.

Embodiment 9

The hyperspectral imaging system of any of the above Embodiments, wherein the spectrum of the light output from the supercontinuum laser source comprises at least 20 wavebands in the near-infrared wavelength region.

Embodiment 10

The hyperspectral imaging system of any of the above Embodiments, wherein the average optical power of the light output from the supercontinuum laser source is between about 40 W and about 400 W.

Embodiment 11

The hyperspectral imaging system of any of the above Embodiments, wherein the average optical power of the light output from the supercontinuum laser source is in a wavelength region between about 1.0 micron and about 1.8 micron is between 40 W and 400 W.

Embodiment 12

The hyperspectral imaging system of Embodiment 3, wherein optical pulses output by the seed laser have a pulse width in a range between 0.5 ns and about 100 ns.

Embodiment 13

The hyperspectral imaging system of Embodiment 3 or 12, wherein optical pulses output by the seed laser have a pulse rate frequency in a range between 50 kHz and 5 MHz.

Embodiment 14

The hyperspectral imaging system of any of the Embodiments above, wherein said transmit optics comprise a focusing optical element.

Embodiment 15

The hyperspectral imaging system of any of the Embodiments above, further comprising a scanning system configured to scan the light output from the supercontinuum laser source across the scene.

Embodiment 16

The hyperspectral imaging system of any of Embodiment 15, wherein said scanning system comprises a scanning mirror disposed to receive light from the supercontinuum laser and direct light received to objects in a scene.

Embodiment 17

The hyperspectral imaging system of any of Embodiment 16, wherein said scanning mirror is disposed to receive light reflected from objects in said scene and direct light from said objects in said scene along a path to said spectrometer.

Embodiment 18

The hyperspectral imaging system of any of the Embodiments above, further comprising receive optics configured to propagate light received from the one or more objects in the scene along a receive path towards the spectrometer.

Embodiment 19

The hyperspectral imaging system of Embodiment 18, wherein the receive optics comprises at least collimating, focusing optics lens, or both.

Embodiment 20

The hyperspectral imaging system of any of the Embodiments above, wherein said spectrometer comprise one or more prisms having wavelength dispersion for wavelengths of light output by said supercontinuum light source and reflected from the one or more objects.

Embodiment 21

The hyperspectral imaging system of any of the Embodiments above, further comprising an array of photodetectors disposed to receive light from said spectrometer, different photodetectors configured to receive light in different respective wavebands from the spectrometer.

Embodiment 22

The hyperspectral imaging system of Embodiment 21, further comprising an array of optical fibers connected to said array of photodetectors, the array of optical fibers disposed to receive light from the spectrometer, different optical fibers of the array of optical fibers configured to receive light in different respective wavebands from the spectrometer.

Embodiment 23

The hyperspectral imaging system of Embodiments 21 or 22, further comprising a digital receiver configured to receive signals from the array of photodetectors.

Embodiment 24

The hyperspectral imaging system of any of the above Embodiments, further comprising a housing at least partially enclosing optical components of the hyperspectral imaging system.

Embodiment 25

The hyperspectral imaging system of Embodiment 24, wherein the housing comprises an aperture through which light output from the supercontinuum laser source is directed towards the one or more objects in the scene.

Embodiment 26

The hyperspectral imaging system of Embodiment 24, wherein light reflected from the one or more objects in the scene is received through said aperture and directed to the spectrometer.

Embodiment 27

The hyperspectral imaging system of any of the above Embodiments, further comprising a receive path directing light received from said one or more objects in said scene to the spectrometer, wherein said transmit path and said receive path are at least partially co-aligned.

Embodiment 28

The hyperspectral imaging system of any of the above Embodiments, wherein the supercontinuum laser source is bore-sighted with the spectrometer.

Embodiment 29

The hyperspectral imaging system of any of the above Embodiments, further comprising a scanning mirror in an optical path between said supercontinuum laser source and said scene as well as in an optical path between said spectrometer and said scene.

Embodiment 30

The hyperspectral imaging system of any of the above Embodiments, wherein said supercontinuum laser has an output having a spot size that is asymmetrical at a distance of about 1 km from the hyperspectral imaging system.

Embodiment 31

The hyperspectral imaging system of any of the above Embodiments, wherein said supercontinuum laser has an output having a spot size that is elliptical at a distance between about 1 km and about 20 km from the hyperspectral imaging system.

Embodiment 32

The hyperspectral imaging system of Embodiment 31, wherein a lateral dimension of the major axis of the elliptical spot size is less than or equal to 10 times a lateral dimension of the minor axis of the elliptical spot size at a distance between about 1 km and about 20 km from the hyperspectral imaging system.

Embodiment 33

The hyperspectral imaging system of Embodiment 32, wherein the lateral dimension of the major axis of the elliptical spot size is in a range between about 1.5 times and about 4 times the lateral dimension of the minor axis of the elliptical spot size at a distance between about 1 km and about 20 km from the hyperspectral imaging system.

Embodiment 34

The hyperspectral imaging system of any of the above Embodiments, wherein a lateral dimension of a spot size of the light output from said supercontinuum laser at a distance between about 1 km and about 20 km is between about 0.1 m and about 1.0 m.

Embodiment 35

The hyperspectral imaging system of any of the above Embodiments, wherein the supercontinuum laser has an irradiance brighter than sun in a wavelength range between about 1.0 micron and about 1.4 micron.

Embodiment 36

The hyperspectral imaging system of any of the above Embodiments, wherein the supercontinuum laser has an irradiance brighter than sun in a wavelength range between about 1.4 micron and about 1.8 micron.

Embodiment 37

The hyperspectral imaging system of Embodiment 16, wherein the scanning mirror is configured to scan at a rate between about 1000 m2/s and about 100000 m2/s.

Embodiment 38

The hyperspectral imaging system of Embodiment 18, wherein the receive optics comprises one or more avalanche photodiodes.

Embodiment 39

The hyperspectral imaging system of any of the Embodiments above configured to resolve objects located at different distances from the imaging system using gating.

Embodiment 40

The hyperspectral imaging system of any of the above Embodiments, wherein the seed optical source comprises one or more amplified spontaneous emitters.

Embodiment 41

The hyperspectral imaging system of any of the above Embodiments, wherein the spectrum of the light output from the supercontinuum laser source extends across all or part of the mid-wave infrared wavelength band from 3 micron to 5 micron.

Embodiment 42

The hyperspectral imaging system of any of the above Embodiments, wherein the spectrum of the light output from the supercontinuum laser source includes wavelengths in the mid-wave infrared wavelength band from 3 micron to 5 micron.

Embodiment 43

The hyperspectral imaging system of any of the above Embodiments, wherein the spectrum of the light output from the supercontinuum laser source extends across a majority of the mid-wave infrared wavelength band from 3 micron to 5 micron.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

BRIEF DESCRIPTION OF THE DRAWINGS

Example implementations disclosed herein are illustrated in the accompanying schematic drawings, which are for illustrative purposes only.

FIGS. 4B-1 and 4B-2 shows schematic diagrams of example beam scanning patterns of the source of illumination provided with the HSI system.

DETAILED DESCRIPTION OF EMBODIMENTS

Figure 1:
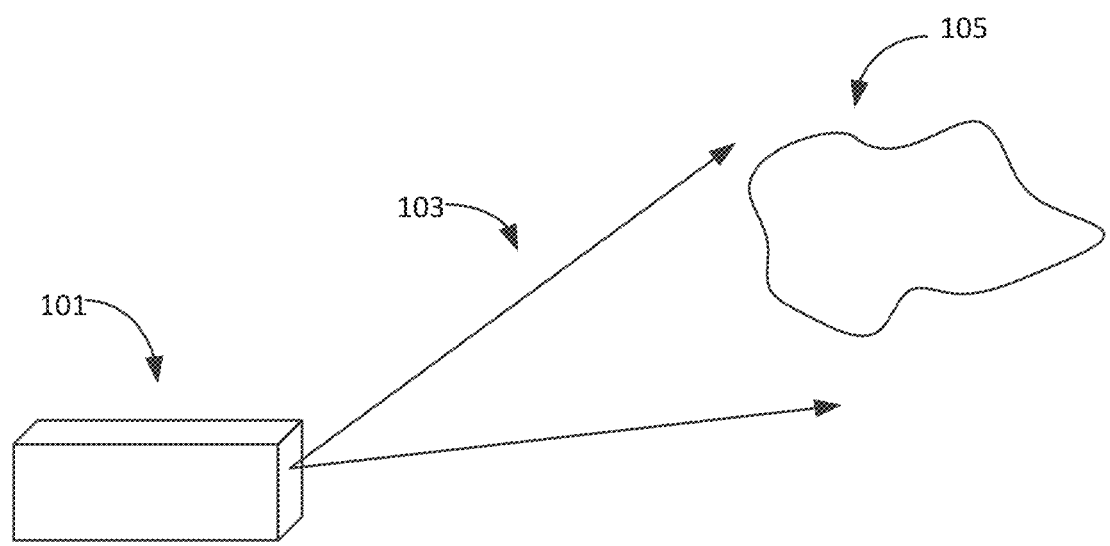
FIG. 1 depicts an example embodiment configured to detect an object using a hyperspectral imaging (HSI) system.

As discussed above, hyperspectral imaging (HSI) systems can collect spectral information from one or more objects in a scene. In some cases, HSI systems can collect spectral information in multiple spectral bands. For example, various embodiments of HSI systems can be configured to collect spectral information from a plurality of spectral bands in the visible, near infrared and/or mid infrared wavelength regions. In some embodiments, at least two of the plurality of spectral bands can be continuous. For example, various embodiments of HSI systems can be configured to collect spectral information from at least two continuous spectral bands in a wavelength range between about 400 nm and about 700 nm. As another example, various embodiments of HSI systems can be configured to collect spectral information from at least two continuous spectral bands in a wavelength range between about 700 nm and about 1 micron. As yet another example, various embodiments of HSI systems can be configured to collect spectral information from at least two continuous spectral bands in a wavelength range between about 1 micron and about 1.3 micron. As another example, various embodiments of HSI systems can be configured to collect spectral information from at least two continuous spectral bands in a wavelength range between about 1 micron and about 1.5 micron. As another example, various embodiments of HSI systems can be configured to collect spectral information from at least two continuous spectral bands in a wavelength range between about 1.3 micron and about 1.5 micron. As yet another example, various embodiments of HSI systems can be configured to collect spectral information from at least two continuous spectral bands in a wavelength range between about 1 micron and about 1.8 micron, between 1.3 micron and about 1.5 micron, between 1.3 micron and 1.8 micron or between 1.5 micron and about 1.8 micron Without any loss of generality, the embodiments of HSI systems described in this application are active HSI systems that employ a light source to illuminate objects in an environment and collect light reflected from the illuminated objects. In contrast to passive HIS systems that rely on reflected ambient light, various embodiments of HSI systems described in this application can distinguish between HSI signal and information from a first object at a first distance and HSI signal information from a second object at a second distance by using gating. Using gating, embodiments of HSI systems described in this application can distinguish HSI information from different objects located at different distances. As a result, depth information, that is, information regarding the relative depth certain objects imaged by the HSI system relative to other objects imaged by the HSI system can be obtained. Various embodiments of HSI systems described in this application, for example, can be configured to distinguish spectral information associated with a first object or set of objects from spectral information associated with a second object or set of objects spaced apart by a distance greater than or equal to about 10 feet from the a first object or set of objects. For example, in such gating process, the light source is configured to transmit a pulse of broadband light that will reflect from a first object or set of objects and return at a second longer distance from the transmitter to the receiver after a first period of time. Energy from the pulse of broadband light may also reflect from a second object or set of objects at a second longer distance from the transmitter and return to the receiver after a second longer period of time. The receiver can be gated so as to measuring the signal received over a short window or period of time. The receiver, for example, may take a first measurement over a first short window the coincides with the first period of time at which light reflected from the first object or set of objects reaches the receiver. Additionally, the receiver may take a second measurement over a second short window the coincides with the second period of time at which light reflected from the second object or set of objects reaches the receiver. By taking first and second measurements corresponding to the first and second windows, the receiver can associate first and second intensities of received signal with the first and second distances or the first and second object(s) respectively. This gating technique can be used to obtain measurements at different times to obtain information from objects that are associated with different distances from the HSI system. Although first and second windows are described above, more than two such windows associate with two such depths may be use. For example, 3, 4, 5, 6, 8, 10, 16, or more depths may be probed. Such depths may be referred to as range bins. Accordingly, the HSI system may include for example 2, 3, 4, 5, 6, 7, 8, 9, 10, 11, 12, 13, 14, 15, 16 or more range bins.

Many embodiments of HSI systems described herein can be configured to operate over a range of distances between about 1 km and about 4 km or between about 2 km and about 8 km.

The collected spectral information can be analyzed to identify and/or detect various objects and materials in the scene. Various embodiments of hyperspectral imaging (HSI) systems can operate by receiving light reflected from various objects in the surrounding. Such embodiments are referred to as reflective HSI systems. Embodiments of reflective HSI systems can benefit from a light source that illuminates the scene. The light source can be configured to emit broadband light, for example, in a plurality of spectral bands in the visible, near infrared and/or mid infrared wavelength regions. At least two of the plurality of spectral bands can be continuous in some implementations. For example, the light source can be configured to emit broadband light in at least two continuous spectral bands in visible and/or shortwave infrared wavelength range (e.g., between about 400 nm and about 2.5 μm). The light source can advantageously allow use of reflective HSI systems in a variety of lighting conditions including conditions in which ambient light intensity is low. In various embodiments of HSI systems, the light source can be integrated with a receiver portion of the hyperspectral imaging system configured to receiver light reflected from objects. In such embodiments, the light source can be referred to as an "on-board" light source since the system or instrument including both the light source and the receiver can be include together on-board, for example, an aircraft such as an airplane or drone, a ship, a ground vehicle, etc. HSI systems comprising an integrated optical source can be referred to as "active HIS systems".

Broadband high-power lamps exist as potential on-board light sources for reflective HSI systems. However, the broadband high-power lamps can be difficult to collimate and direct with small divergence over long distances. Conventional lasers with high brightness and low divergence are available and can be integrated in various embodiments of reflective HSI systems. However, many conventional lasers may not be broadband and can have limited spectral bandwidths. Further, it may be possible to integrate multiple conventional lasers with high brightness and low divergence to provide a broadband light source for a reflective HSI system. However, such systems may be bulky and/or heavy and may be impractical for use. Such components can be included in HSI systems described herein, however, systems using one or more super-continuum lasers as a light source can offer advantages.

Super-continuum lasers (SCLs), for example, can have high brightness and low divergence similar to conventional lasers. However, unlike many conventional lasers, SCLs can also have a broad spectral bandwidth. Additionally, embodiments of a SCL can be engineered to provide a desired amount of output optical power in one or more spectral bands in the visible and/or infrared spectral regions. For example, some embodiments of a SCL can be engineered to output light having substantial equal power in a plurality of spectral bands in the visible and infrared spectral ranges. In such embodiments, the optical power in a spectral band can be within ±10% of the optical power in another spectral band. In various embodiments, the spectrum power distribution of the light output from the SCL need not be flat or substantially flat. In such embodiments, the optical power in a spectral band can, for example, be within ±50% of the optical power in another spectral band.

In various embodiments, high-powers SCLs can be configured to emit light in shortwave infrared wavelength regions (e.g., in a wavelength range between about 750 nm and about 2.5 micron). Such SCLs can be integrated with HSI systems configured to operate in shortwave infrared wavelength region (SWIR) (e.g., in a wavelength range between about 750 nm and about 2.5 micron) to obtain an active HSI system configured to operate in the SWIR. Active HSI systems comprising SCLs configured to operate in SWIR can be advantageously used for covert operations since the light emitted from the light source or the reflected light from various objects in the scene is not visible. Additionally, many materials in objects of everyday use possess spectral features in the SWIR. Accordingly, these objects of everyday use can be detected using active HSI systems comprising SCLs configured to operate in short-wave infrared wavelength region.

Furthermore, in certain configurations, active HSI systems comprising SCLs configured to operate in shortwave infrared wavelength region or other wavelength regions can be configured to collect three-dimensional (3D) information using the process of range-gated imaging. Without relying on any particular theory, in range-gated imaging, a pulsed light source such as pulsed laser or SCL is used to illuminate a scene. Light reflected by various objects in the scene is detected with a camera having a short exposure time referred to as a gate. The gate is delayed so imaging occurs at a particular range (or distance), thus the image is only from the reflection of objects at the particular range (or distance). The range-gated imaging therefore allows distance information to be obtained as the reflected light captured can be correlated with different relative distances. Range gated imaging can also enable imaging at long ranges while reducing the effect of obscurants such as, for example, fog, rain, or smoke in the short range. For example, in the embodiments of HSI systems with gating such as for example gating described herein, the light from the source of illumination scattered by smoke or fog can be removed to obtain a clear image of objects obscured by fog or smoke. In contrast, in passive HSI systems, smoke or fog will cause a reduction in the amount of signal received by the photodetector which can impact clarity of the detected objects.

FIG. 1 depicts an active HSI system comprising a light source 101 comprising for example a SCL configured to emit broadband radiation 103 that illuminates objects 105 in a scene. The active HSI system can further comprise a receiver configured to receive light reflected from the object. In this manner, the HSI system can detect materials and/or objects in a scene. The light source may or may not comprise a SWIR source (e.g., a SCL configured to operate in the shortwave infrared wavelength region). The active HSI system, comprising a SWIR source in some embodiments, can be included in or integrated with aerial or ground surveillance systems and/or security devices in some embodiments. For example, embodiments of active HSI systems, possibly comprising a SWIR source, can be disposed in aircraft such as airplanes, helicopters, drones, ships or boats, ground vehicles such as trucks, buildings such as surveillance towers, other ground surveillance systems, and/or security devices. Various embodiments of active HSI systems comprising a SWIR source can be used to detect materials with spectral characteristics in the short-wave infrared wavelength region. Using gating techniques such as described above, various systems and methods described herein comprise active HSI systems that are configured to collect 3D information from objects at distances between 1 km and 20 km. For example, various systems and methods described herein comprise active HSI systems that are configured to collect 3D information from objects at distances up to 2 km. HSI systems such as described herein can include illumination/light sources such as supercontinuum lasers having sufficient output optical power to be used for object distance detection between 1-20 km (e.g., up to 2 km or more). Several embodiments of active HSI systems described herein comprise a super continuum laser (SCL) configured to operate in shortwave infrared wavelength ranges. For example, the SCL can be configured to operate in a spectral range between about 700 nm and about 2.5 μm, between about 750 nm and about 2.0 μm, between about 980 nm and about 2.0 μm, between about 1.0 μm and about 1.8

μm, between about 1.3 μm and about 1.7 μm, between about 1.3 μm and about 1.6 μm, or at any wavelength in a range/sub-range defined by any of these values.

The SCL can be configured to emit broadband light in one or more of the wavelength ranges between about 700 nm and about 2.5 μm, between about 750 nm and about 2.0 μm, between about 980 nm and about 2.0 μm, between about 1.0 μm and about 1.8 μm, between about 1.3 μm and about 1.7 μm, between about 1.3 μm and about 1.6 μm. In some implementations, SCL light source and the HSI system output light in at least 70%, 80%, 90%, 95%, 99%, or more (e.g., 100%) of the wavelengths in any of these ranges. In various embodiments, the bandwidth of the broadband light emitted from the SCL measured as the full width at half-maximum (FWHM) in any of the above wavelength ranges can be greater than or equal to about 30 nm, greater than or equal to about 50 nm, greater than or equal to about 100 nm, greater than or equal to about 200 nm, greater than or equal to about 300 nm, greater than or equal to about 500 nm, greater than or equal to about 800 nm and/or less than or equal to about 1000 nm or in any range between any of these values. As discussed above, the light emitted from the SCL can comprise a plurality of spectral bands within the bandwidth of the broadband light emitted from the SCL. At least two of the plurality of spectral bands can be continuous. The number of spectral bands within the bandwidth of the broadband light emitted from the SCL can be greater than or equal to 20, greater than or equal to 30, greater than or equal to 50, greater than or equal to 80, greater than or equal to 100, and/or less than or equal to 200. For example, some embodiments of active SWIR HSI systems described herein are configured to emit broadband light in approximately 80 wavelength bands spanning the wavelength range between about 1.0 μm and about 1.8 μm. Various embodiments of active SWIR HSI systems described herein are configured to have a spectral resolution in a range between 1 nm and 100 nm. For example, the spectral resolution of various embodiments of active SWIR HSI systems described herein can be about 10 nm. Various embodiments of active HSI systems, such as SWIR HSI systems, described herein are configured to have a spectral resolution of about 10 nm with a ground sample distance (GSD) of 1 m operating at a 2 km range. Ground sample distance (GSD) can correspond to the distance on the ground that can be resolved by the HSI system. Without any loss of generality, the GSD can depend on the shape and the size of the optical spot on the ground. In some embodiments, the ground sample distance corresponds to the distance between objects on the ground that are imaged in adjacent pixels of a digital image such as an aerial image. In various embodiments, the GSD can be between 0.1 m and about 10 m for an operating distance between about 1 km and 20 km. Various embodiments of HSI systems described herein can be configured to have a range resolution between about 1 m and about 100 m for an operating distance between 1 km and 20 km. Range resolution can correspond to the minimum difference in the distance of two objects from the transmitter that can be resolved. For example, a system can be considered to have a range resolution of $\Delta d$ if a first object located at a first distance $d_1$ from the transmitter and a second object located at a second distance $d_1 + \Delta d$ or more can be distinguished from each other while a third object located at a third distance between $d_1$ and $d_1 + \Delta d$ cannot be distinguished from the first object or the second object. Additional details of active HSI systems such as SWIR HSI systems are discussed below.

Design of an Active HSI System

Figure 2A:
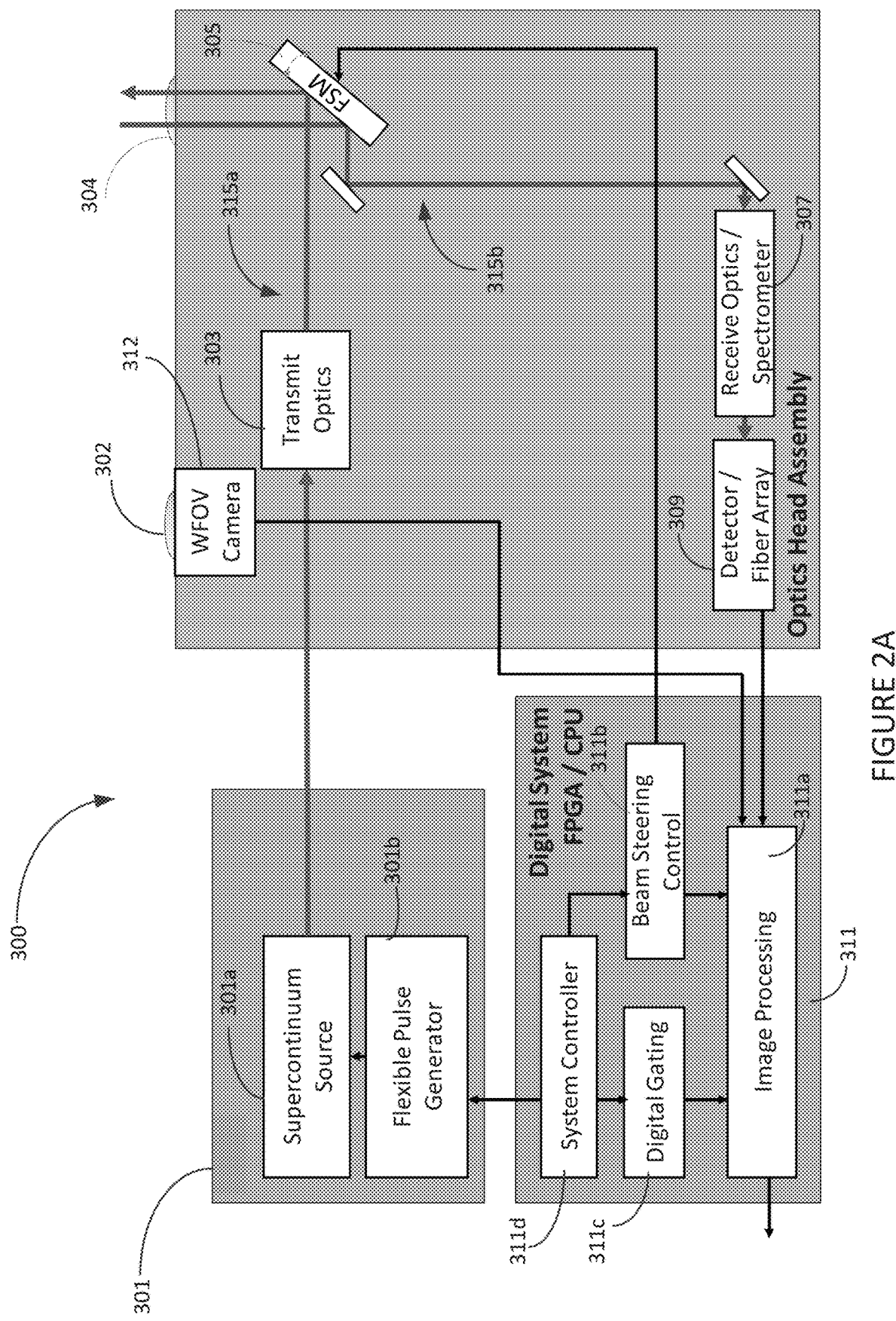
FIG. 2A and FIG. 2B schematically illustrate different embodiments of a HSI system comprising a source of illumination and a spectrometer.

FIG. 2A illustrates the design of an embodiment of an active HSI system. This system may be a SWIR system in some implementations but is not so limited. Various embodiments of an active HSI system comprise an optical source 301, a transmitting optical system 303 configured to receive light from the optical source 301 and transmit the received light towards an object, optionally through an aperture 304 along a transmit path 315a. The HSI system may further comprise a receiving optical system 307 and an optical detection system 309. Light reflected from the object may be received optional through the aperture 304 (e.g., through a transmit and receive aperture, Tx/Rx aperture) along a receive path 315b and received by the receiving optical system 307 and the optical detection system 309.

Figure 2B:
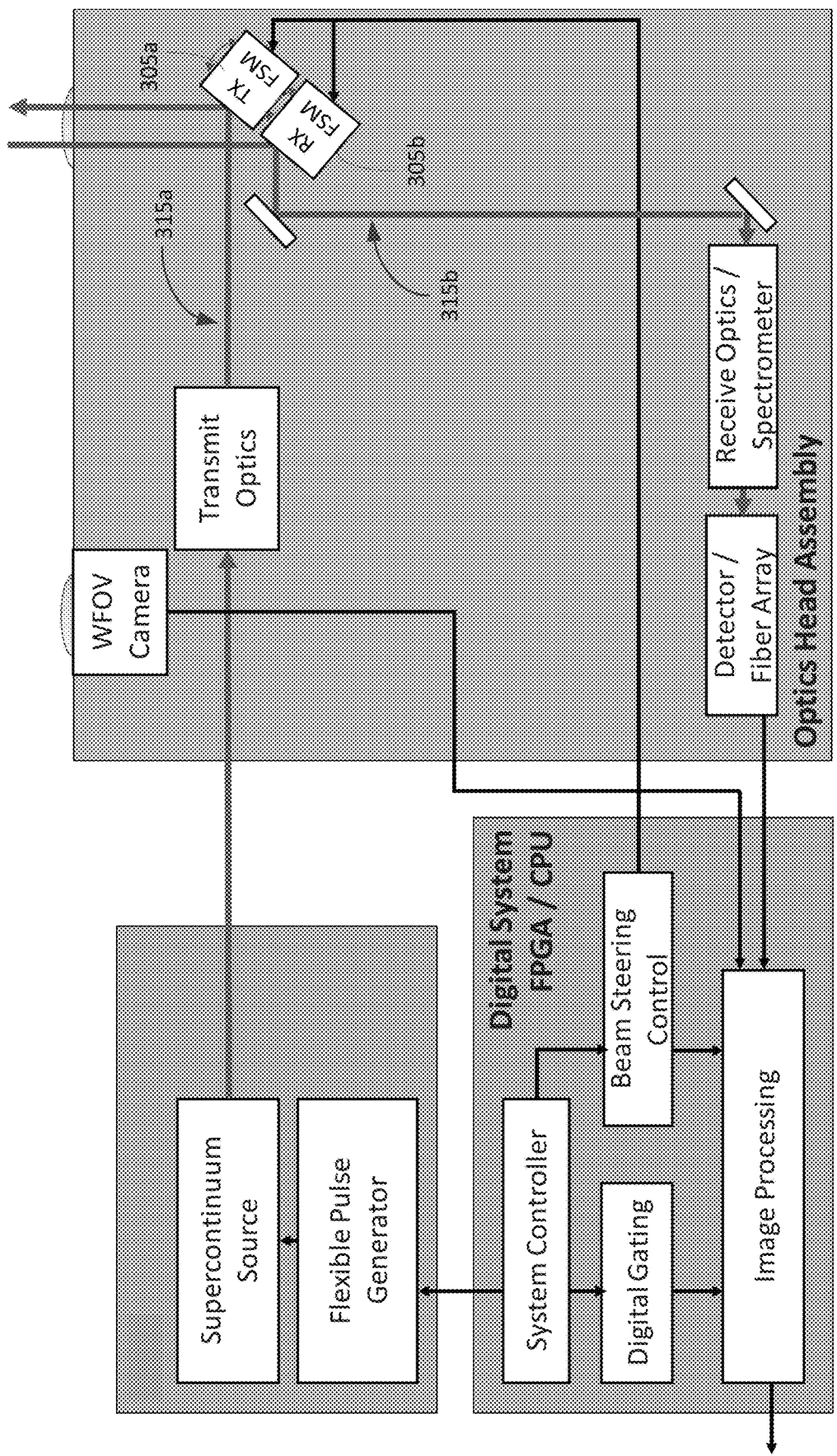

The HSI system shown in FIG. 2A is further comprises a scanning system 305. This scanning system 305 may be configured to perform scanning of the scene. In particular, in the embodiment shown in FIG. 2A, the scanning system 305 comprises a scanning mirror. In the embodiment shown, the scanning system 305 is configured to co-align the transmit path 315a and the receive path 315b as shown in FIG. 2A, however other types of designs are possible. For example, different embodiments of the HSI system can comprise two scanning systems 305a and 305b as shown in FIG. 2B. One scanning system (e.g., scanning system 305a) can be placed in the transmit path 315a and another scanning system (e.g., scanning system 305b) can be placed in the receive path 315b. The scanning mirror 305 can comprise, for example, a reflector mounted on a movable mechanical system (e.g., a galvanometer). The movable mechanical system can be configured to mechanically move the reflector in a range between about ±3 degrees (or optically in a range between about ±6 degrees). The size of the reflector can, in some cases, be configured according to the size of the beam received from the optical source 301 and/or the size of the reflected light beam. The mechanical system can be configured to be moved to direct the light beam from the optical source 301 at different locations in the scene. For example, the mechanical system can be configured to be rotated about an axis to direct the light beam from the optical source 301 at various locations in the scene. The scanning mirror 305 can be configured as a fast scanning mirror having a scanning rate between about 1000 degrees/second and about 10,000 degrees/second.

The mirror can also be scanned to collect light from different regions of the scene. As referenced above the same mirror can be used to both direct the light beam to the objects in the scene and receive the light reflected from the objects. Moving the mirror can thus operate to scan the beam from the light source across the scene as well as scan the scene for collecting light reflected from objects therein. Other configurations, however, are possible. For example, two scanning mirror, one mirror for transmission of the light beam from the light source to the scene and one mirror for collecting and receiving light from different locations of the scene may be used. Two apertures, one for transmission and one for receiving can also be used in some embodiments. Additionally or alternatively, in some embodiments, transmission and/or collection is not performed using scanning, e.g., a scanning mirror. For example, embodiments of HSI system configured to operate over a short range and/or configured to have a narrow field of view (FOV) may not employ a scanning system. In some embodiments, scanning of the mirror(s)/reflector(s) may be in two dimensions, (e.g., horizontally and vertically or in x and y directions). In some embodiments scanning of the mirror(s)/reflector(s) may be in one dimension (e.g., scanning in the horizontal direction or x direction). For example, in embodiment of HSI system deployed on an aerial vehicle or aircraft (e.g., airplane, helicopter, drone) may employ only 1 dimensional scanning (e.g., scanning in a direction transverse to the direction of motion of the aerial vehicle or aircraft or x direction) while the motion of the aerial vehicle or aircraft (e.g., airplane, helicopter, drone) (e.g., along y direction) may provide scanning in the second dimension.

The system further comprises electronics 311 configured to process the signals from the optical detection system 309 and/or to provide control signals to various components of the system possibly including but not limited to the optical source 301 and/or the scanning mirror 305.

In various embodiments, the optical source 301 can comprise a supercontinuum laser 301a. The supercontinuum laser 301a can comprise a seed optical source and a non-linear medium (e.g., a non-linear fiber or a non-linear crystal). The supercontinuum spectral broadening is a result of seed pulses interacting with the non-linear medium, resulting in pulsed emission across a wide range of wavelengths as in FIG. 5. In some embodiments, a pulse generator 301b can be configured to control one or more parameters of the pulses output from the seed laser to control one or more parameters of the output of the SCL. The pulse generator 301b can comprise an electro-optic modulator configured to modulate the output of a CW seed optical source. Alternately, the pulse generator 301b can be controlled to modulate the optical seed source directly, of the seed source supports pulsed operation.

The super continuum laser 301a can be configured to output laser light in shortwave infrared wavelength regions. For example, the supercontinuum laser 301a can be configured to emit light in a plurality of spectral bands in a wavelength range between about 700 nm and about 2.5 μm, between about 750 nm and about 2.0 μm, between about 980 nm and about 2.0 μm, between about 1.0 μm and about 1.8 μm, between about 1.3 μm and about 1.7 μm, between about 1.3 μm and about 1.6 μm, or at any wavelength in a range/sub-range defined by any of these values. In some embodiments, the supercontinuum laser can emit light in the visible spectrum, such as between 400 nm and 650 nm and/or between 400 nm and 700 nm. Operation outside these ranges is also possible.

The average optical power of the laser light emitted from the super continuum laser 301a can be in a range between about 40 W and about 75 W. For example, the average optical power of the laser light emitted from the super continuum laser 301a can be in a range between about 40 W and about 45 W, between about 44 W and about 47 W, between about 45 W and about 48 W, between about 46 W and about 50 W, between about 50 W and about 60 W, or between about 60 W and about 75 W or in any range formed by any of these values. In some embodiments, the average optical power of the laser light emitted from the super continuum laser 301a can be in a range between about 75 W and about 400 W. For example, the average optical power of the laser light emitted from the super continuum laser 301a can be in a range between about 75 W and about 100 W, between about 100 W and about 200 W, between about 200 W and about 275 W, between about 250 W and about 325 W, between about 275 W and about 350 W, between about 300 W and about 375 W, between about 325 W and about 400 W, or in any range/sub-range defined by any of these values. Values outside these ranges are also possible.

The transmitting optical system 303 can comprise beam shaping optical elements (e.g., focusing lenses and/or collimating lenses, reflectors, prisms, mirrors, parabolic mirrors, etc.) that are configured to receive light output from the supercontinuum laser such as from an optical fiber connected to the supercontinuum laser 301a and tailor the shape or other attributes of the laser beam emitted from the supercontinuum laser 301a. For example, in various embodiments, the laser beam emitted from the super continuum laser 301a can be tailored to have an elliptical shape spot at a distance of about 2 km. The length of a major axis of the elliptically shaped spot at a distance of about 2 km can be about 0.8 m and a length of a minor axis of the elliptically shaped spot at a distance of about 2 km can be about 0.2 m. In other embodiments, the laser beam spot emitted from the active HSI system can be engineered to have a circular shape. The size of a circular beam can be about 0.8 m at distance of 2 km to about 1-2 m at a distance of 20 km, for example.

The receiving optical system 307 can comprise receiving optics such as for example, collecting lenses or mirrors, focusing lenses or mirrors, collimating lenses or mirrors, prisms, gratings (e.g., diffractive or holographic gratings). In various embodiments, the receiving optical system 307 can comprise a spectrometer. The spectrometer may comprise one or more wavelength dispersive optical elements such as for example one or more refractive optical element such as for example as a prism or multiple prisms which may have wavelength dispersion. The spectrometer may comprise one or more diffractive optical elements such as one or more gratings that provide wavelength dispersion. Other such wavelength dispersive elements may be used. Light is received by the wavelength dispersive element and separated into different wavelength components with different wavelengths directed in different directions and/or locations.

The light source (e.g. super continuum laser 301a) and/or transmitting optical system can be aligned (or boresighted) with the receiving optical system 307 and possibly utilize the same transmit/receive (Tx/Rx) aperture 304 such that the transmit path and the receive path outside the active HSI optical system 300 (e.g., on the ground) overlap with each other. As discussed above, spatial multiplexing may be provided by one or more scanning system 305. By employing spatial multiplexing, the transmitted optical signal and the received optical signal are combined using a single scanning system (e.g., scanning system 305a shown in FIG. 2A). In various embodiments, the transmitted optical signal and the received optical signal can be separated, e.g., by 1 inch. Likewise, in some embodiments the laser spot and receiver spot can be co-aligned or overlapping. Additionally, in such systems, the optical axis of the instrument can be aligned or set via electronic calibration of the scanning system 305. Similarly, in some embodiments spectral imagery can be obtained via raster scanning using the steering mirror 305. Other scanning patterns or approaches are also possible. For example, as discussed above, other embodiments of active HSI systems need not employ spatial multiplexing with a single scanning system but can instead have two different scanning systems for the transmitted optical signal and the received optical signal as shown in FIG. 2B.

The optical detection system 309 can comprise one or more photodetectors. The one or more photodetectors can be configured to receive light in different spectral bands such of different spectral bands of the shortwave infrared wavelength region. The photodetectors may for example, be disposed at different locations to receive different wavelengths directed into different directions by the dispersive optical element (e.g., prism(s)). In various embodiments, the optical detection system 309 can comprise 80 discrete photodetectors configured to receive light in 80 different spectral bands in a wavelength region between about 1.0 micron and about 1.8 micron. The number of photodetectors of the optical detection system 309 can be less than or greater than 80 in some other embodiments. Without relying on any particular theory, various embodiments of the HSI system can employ one (1) photodetector for each spectral bin. Other configurations are also possible. In various embodiments, the receiving optical system 307 can comprise a fiber array including a plurality of fibers connected to the discrete photodetectors (e.g., avalanche photodiodes). Light receiving ends of the plurality of fibers may, for example, be disposed at different locations to receive different wavelengths directed into different directions by the dispersive optical element (e.g., prism(s)). Light outputting ends of the plurality of fibers may be disposed with respect to the photodetectors to direct light from the fibers to the photodetectors (e.g., avalanche photodiodes). In some other embodiments of active HIS systems, the fiber array connected to the discrete photodetectors can be replaced by a focal plane array including an array of avalanche photodiodes. The receiving optical system 307 can also comprise a lens array (e.g., a microlens array) configured to receive reflected light in the different spectral bands and focus the received reflected light in the different spectral bands onto the photodetectors, for example, onto respective discrete photodetectors. In some embodiments receiving optical system 307 can also comprise a lens array (e.g., a microlens array) configured to receive reflected light in the different spectral bands and focus the received reflected light in the different spectral bands onto different optical fibers. Other configurations are also possible.

In certain embodiments of the active HSI system, the received light energy is directed by the steering mirror 305 along the receive path 315b to a micro-lens array, which focuses light onto fiber bundles coupled to a plurality of discrete photodetectors. The receive path 315b comprises collimating, focusing and wavelength dispersive elements such as prisms or diffraction gratings. The micro-lens array is situated so that each element gathers a different portion of the dispersed light from the receive path 315b. Thus, each photodetector responds only to a specific portion of the received spectrum. In some embodiments, the number of elements in the receive path 315b may be reduced by integrating collimating and dispersive elements, for example by placing dispersive rulings on a curved focusing mirror. The plurality of discrete photodetectors can comprise InGaAs avalanche photodiodes (APDs) or extended range InGaAs PIN photodiodes or combinations thereof. Other types of photodetectors may also be employed. These photodetectors may be included in an array, e.g., a detector array. In some embodiments, the plurality of the photodetectors can be configured for increased sensitivity to wavelengths between about 1.0 micron and about 1.8 micron in some embodiments. In some embodiments, photodetectors configured with increased sensitivity to other wavelengths, such for example, as visible wavelengths or other infrared wavelengths may be used or included.

The signals output from the one or more photodetectors can be input to an image processing unit 311a. The image processing unit 311a can comprise an electronic processing system, such as, for example, a microprocessor. The image processing unit 311a can be a part of the electronics 311.

As discussed above, the electronics 311 can further comprise control electronics that provide control signals to various components of the HSI system. For example, the electronics 311 can optionally include a system controller 311d that provides electrical control signals to the pulse generator 301b to control the modulation rate. In various embodiments, the electronics 311 can comprise field programmable gate arrays (FPGAs) that can be user programmable. Such a system controller 311d can possibly provide control signals to a beam steering control element 311b that controls the movement, scan, and/or scan rate of the scanning mirror 305. Such a system controller 311d can possibly provide control signals to a digital gating element 311c that can be used to control the image processing element 311a to provide range-gated imaging. A system controller 311d can provide any one or combination of such features and may comprises one or more electronic components, systems, subsystems, or electronics at one or more locations.

In various embodiments, the active HSI system (e.g., SWIR HIS system) can comprise a camera 312 configured to obtain an image of the scene through a camera aperture 302. This camera may, for example, comprise a visible camera the captures images in visible wavelengths using a detector array sensitive to visible wavelengths and/or infrared (e.g., SWIR). In various embodiments, the camera 312 can comprise a wide field of view (WFOV) camera. In some embodiments, the field of view (FOV) of the camera 312 can be larger than the FOV of the receiver optical system 307 comprising the one or more photodetectors 309. Accordingly, in some embodiments the receiving optical system 307 comprising the one or more photodetectors 309 may not be configured to collect spectral information from the entire FOV imaged by the camera 312, for example, at a given time, e.g., in a single second or two. Instead, the receiving optical system 307 comprising the one or more photodetectors 309 is configured to collect spectral information from a portion of the scene that is illuminated by the beam output from the optical source 301. As described above, scanning of the light source beam and the collection path may facility collecting signal from multiple portions of the scene. Other systems may also be employed the utilized scanning in only one direction or do not rely on beam scanning and/or scanning of the light collection path to capture images.

An embodiment of the active HSI system comprises multiple discrete photodetectors (e.g., 80 discrete photodetector), each connected to independent Analog-to-Digital Converters (ADCs) (e.g., a 14-bit ADC). The photodetectors may comprise, for example, avalanche photodiodes, which may provide increased sensitivity to lower signal levels. In various embodiments, such photodetectors and ADC's may operate at frequencies between about 25-50 MHz. In one embodiment, the ADCs can be configured to operate at a frequency of 25 MHz such that each return signal is sampled with a granularity of 40 ns. Operation at other frequencies are also possible.

In some embodiments, the receiver and the optical source can operate synchronously. In various embodiments the receiver and/or optical source can support arbitrary pulse train patterns. For example, various embodiments of the scanning system 305 can comprise a sensor that provides information regarding the direction towards which the scanning system 305 is pointing. In such systems, the pulse pattern can be changed as the direction of the scanning system 305 changes to increase the signal-to-noise ratio over one or more portions of the field of view and/or the scan of the scanning system 305. For example, the pulse pattern can be changed as the direction of the scanning system 305 changes to increase the signal-to-noise ratio in the center of the field of view and/or the center of the scan of the scanning system 305. As discussed above, the HSI system architecture can allow for "post collection" digital gating (e.g., via the digital gating element 311c). Such arrangement can provide for range estimation and/or for advanced sample averaging. In various embodiments, the "throughput" or number of averaged laser pulses is determined by a combination of this slew rate, the source pulse rate frequency (PRF), and the receiver sample rate. In certain embodiments, the scanning mirror slews at a constant rate along each scan line, for example, in a raster scan.

Figure 3:
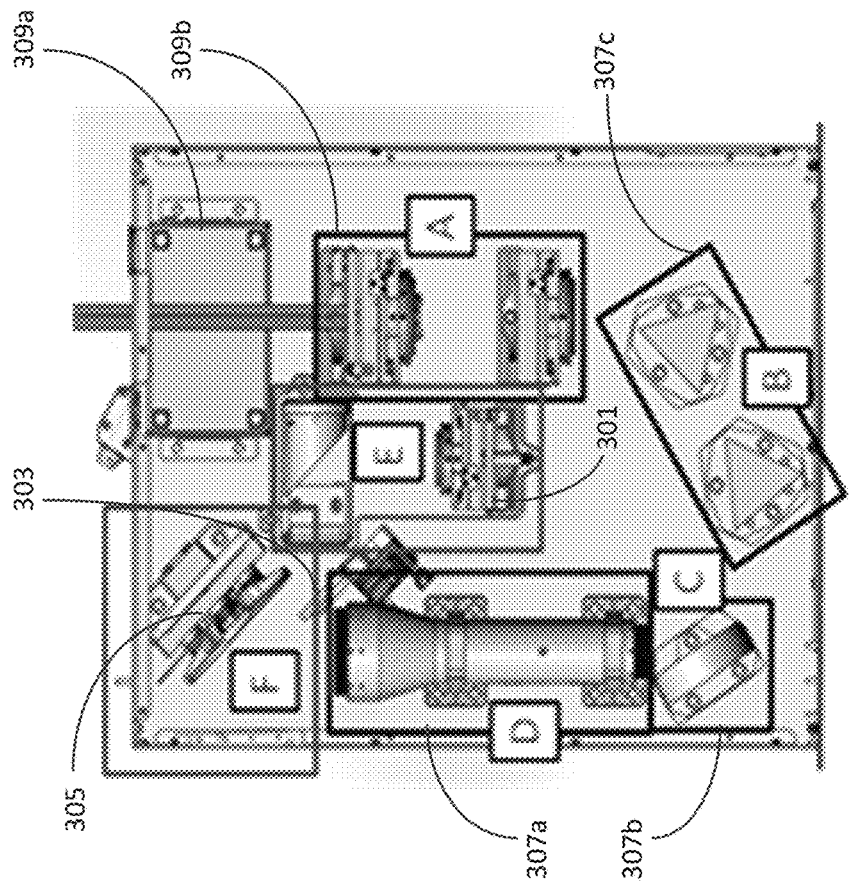
FIG. 3 schematically illustrates a layout of a transmit path and a receive path of an embodiment of a HSI system comprising a source of illumination.

FIG. 3 schematically illustrates an example layout of the transmit path and the receive path of an embodiment of an active HSI system comprising a source 301 of illumination such as a supercontinuum laser. The output of optical source 301 is directed towards the scanning mirror 305 via transmit optics 303. The optical source 301 can be a super continuum laser comprising a pump laser with non-linear optical fiber to broaden the spectral output of the pump source. The supercontinuum laser can be configured, for example, to provide an average output power of 50 W over a spectral range between about 750 nm and about 1.8 microns, with approximately 44 W in the 1.0 micron to 1.8 micron SWIR wavelength range.

In the illustrated embodiment, the transmit optics 303 may comprise a reflective optical element and may be configured to provide optical power such as focusing power. The transmit optics 303 may include, for example, a reflector with optical power such as a curved reflector such as a parabolic mirror. In the embodiment shown in FIG. 3, the transmit optics 303 receives light from a fiber end cap that is optically coupled to the output of the non-linear fiber of the optical source 301. In some implementations, the fiber end cap may comprise an optical element that advantageously expands or allow expansion (e.g., divergence) of the light beam emitted from the non-linear fiber of the optical source 301 prior to exit into ambient. This light reflects from the reflector, e.g., curved or parabolic reflector, and is directed to the scanning mirror 305. In this example, another mirror is used to direct the light from the curved reflector to the scanning mirror. The scanning mirror 305, in certain embodiments, has a size between 2 and 5 inches across and may be different dimensions in different directions. The scanning mirror 305, for example, may have a size of about 4.5 inches by 3 inches. Light from the SCL and transmit optics is reflected off the scanning mirror 305 to the scene. Additionally, in this configuration, the scanning mirror 305 is used to receive light from the scene. Light reflected from object in the scene is incident on the scanning mirror 305 and is directed towards a fiber array 309a via a receiving optical system 307 comprising a lens system 307a which may including collimating and/or focusing lenses, a fold mirror 307b (e.g. a 3 inch aperture fold mirror) and a dispersive system 307c comprising one or more prisms. As discussed above, the dispersive system 307c can disperse the different wavelength components of the received from the scene into a plurality of spectral bands (e.g., 80 spectral bands). The plurality of spectral bands can be coupled into the individual fibers of the fiber array 309a using a lens system 309b. The lens system 309b can, in some embodiments, comprise a camera lens. The individual fibers of the fiber array 309a can be coupled to a photodetector that is configured to detect light in one or more of the plurality of spectral bands. Other configurations are possible. For example, different optical components and arrangement may be used. Additional optical components can be included and/or certain optical components can have different parameters or be excluded. For example, additional mirrors or reflector can be used to configure the optical path as desired.

System Operation

Various embodiments of the active HSI system, such as an SWIR HSI system, can be designed to operate to achieve high signal-to-noise ratio (SNR). Such a system may be configured to maintain flexibility with respect to pulse averaging and/or area revisit. Without any loss of generality, SNR of the spectral information collected from the objects can be improved by increasing the number of times an object is scanned or revisited. Different areas of a scanned region can be revisited by directing the illumination beam from the optical source towards the different areas. One mode of operation of the active HSI system can include scanning a region and then revisiting one or more areas in the scanned region that include objects of interest. Accordingly, in various implementations, revisiting a scanned area can reduce the amount of area scanned. As discussed above, such systems scan a scene and may employ, for example, raster scanning.

As discussed above, an embodiment of an active HSI system can be designed to provide an elliptical beam shape such as a beam with a 4×1 aspect ratio. The beam spot may, for example, be a 0.2 m×0.8 m spot size at 2 km range. The elliptical laser spot at a distance of 2 km is indicated by reference numeral 501 in FIG. 4A. The field-of-view (FOV) of the receiver at 2 km can be symmetrical. For example, the FOV may be circular. In some embodiments, the FOV may have a diameter of about 1 m as shown by reference numeral 503 in FIG. 4A. Accordingly, in certain embodiments, while the laser beam is asymmetrical having an aspect ratio for example between 4×1 and 10×1, the FOV of the receiver may be symmetrical. In some embodiments, the size of the beam not larger than the FOV of the receiver. For example, the longest dimension of the beam spot size is not larger than the FOV of the receiver. In various embodiments, for an extended target and assuming equivalent laser output power, the received signal from a smaller elliptical beam is equivalent to a broader circular beam that fills the entire FOV of the receiver. For example, a FOV of 0.8 m×0.8 m can be achieved by stacking four (4) 0.2 m wide ellipses. The asymmetric, e.g., elliptical, shape of the laser spot can compensate for the constant motion (e.g., linear motion) of the scan mirror, which can degrade spatial resolution. Additionally, the smaller beam is advantageous for targets smaller than the receiver FOV.

Figures 1, 4B:
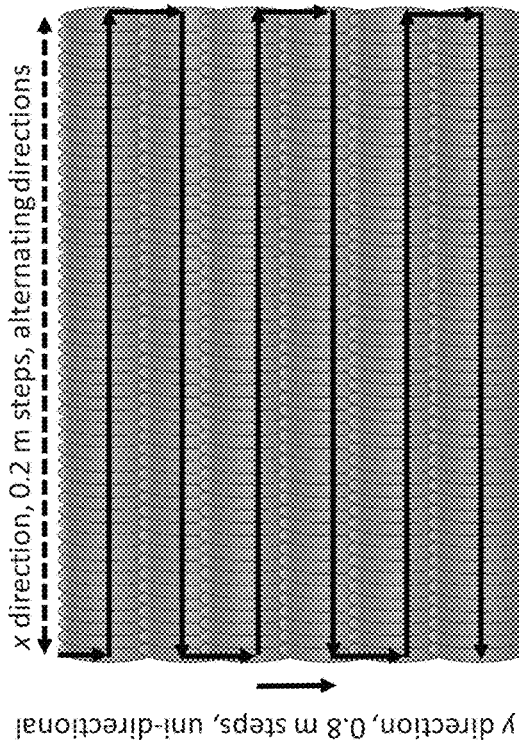
Figure 4A:
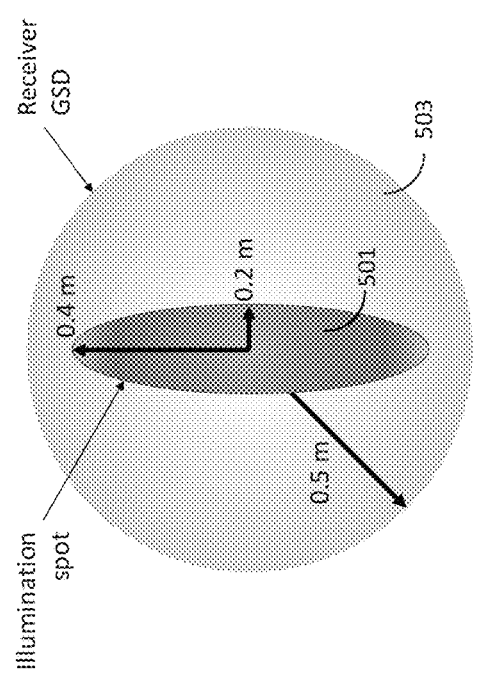
FIG. 4A shows the spot size of the beam emitted from the source of illumination provided with the HSI system relative to the ground sample distance of the receiver of the HSI system.
Figures 2, 4B:
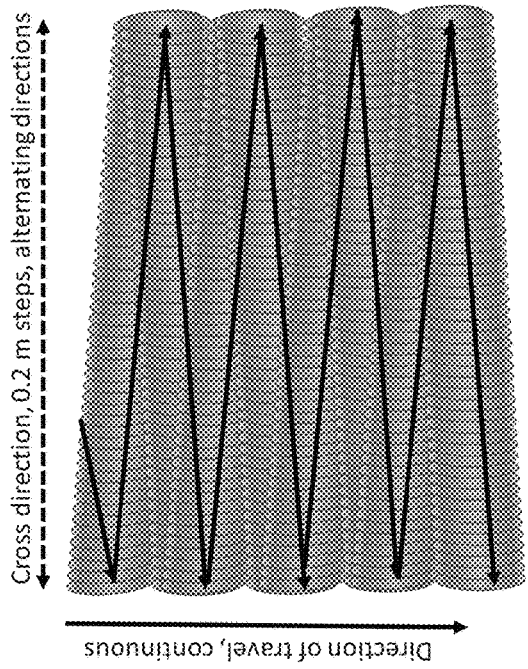

FIGS. 4B-1 and 4B-2 illustrate example scanning patterns employed by the system active HSI system to scan a scene. In the example scanning pattern shown in FIG. 4B-1, the mirror is moved from left to right and right to left along paths that are generally parallel to each other. In the example scanning pattern shown in FIG. 4B-2, the mirror is moved from left to right and right to left along straight paths angled with respect to each other (e.g., zig-zag pattern). Although, the motion of the FSM may be continuous along the x-dimension, the nomenclature "step" in the x-dimension is used in FIGS. 4B-1 and 4B-2 to denote the motion/time between received laser pulses. According to this nomenclature, the x-step size can be considered to be the distance moved by the mirror between received pulses. The steps-per-pixel can be considered to be the number of pulses received over the course of one FOV/GSD. Without any loss of generality, the pixel size can be equal to the spot size of the beam or plurality of spot sizes, for example, integrated together. The step in the y-dimension is discrete and can be provided by a user to define the amount of overlap between rows. While the user can specify the total steps in either dimension, the total field-of-regard is limited by the bounds of the FSM and receiver optics to approximately ±3°. In various embodiments, the laser spot is asymmetric, longer in one direction (e.g., y direction) than another for example orthogonal direction (e.g., x direction). In some embodiments, scan is such that the beam changes in x-position faster than the beam changes in y-position. The scan speed in the x direction is faster than the scan speed in the y direction. As described above, the x and/or y dimensions can correspond to the motion on the ground. Other configurations are possible.

A single scan pattern can produce a four-dimensional (4-D) data set comprising 2 spatial dimensions, 1 spectral dimension (80 bands), and 1 temporal dimension (range bins). As described above, gating or discrete measurement windows at different times may provide for range bins as light reflected from objects at different ranges will reach the receiver at different times. An example product may have 100×100 spatial pixels with 80 bands and 16 range bins. For a "flat" scene, only a few of the flight bins may possess "signal" from the target whereas the remainder may be sensor noise and/or ambient scene light Each range bin could potentially be treated as a separate hyperspectral data cube and processed independently of the remainder.

System Testing and Characterization

A prototype of an active SWIR HSI system was tested, and its performance is provided below.

Source Performance

Figure 5:
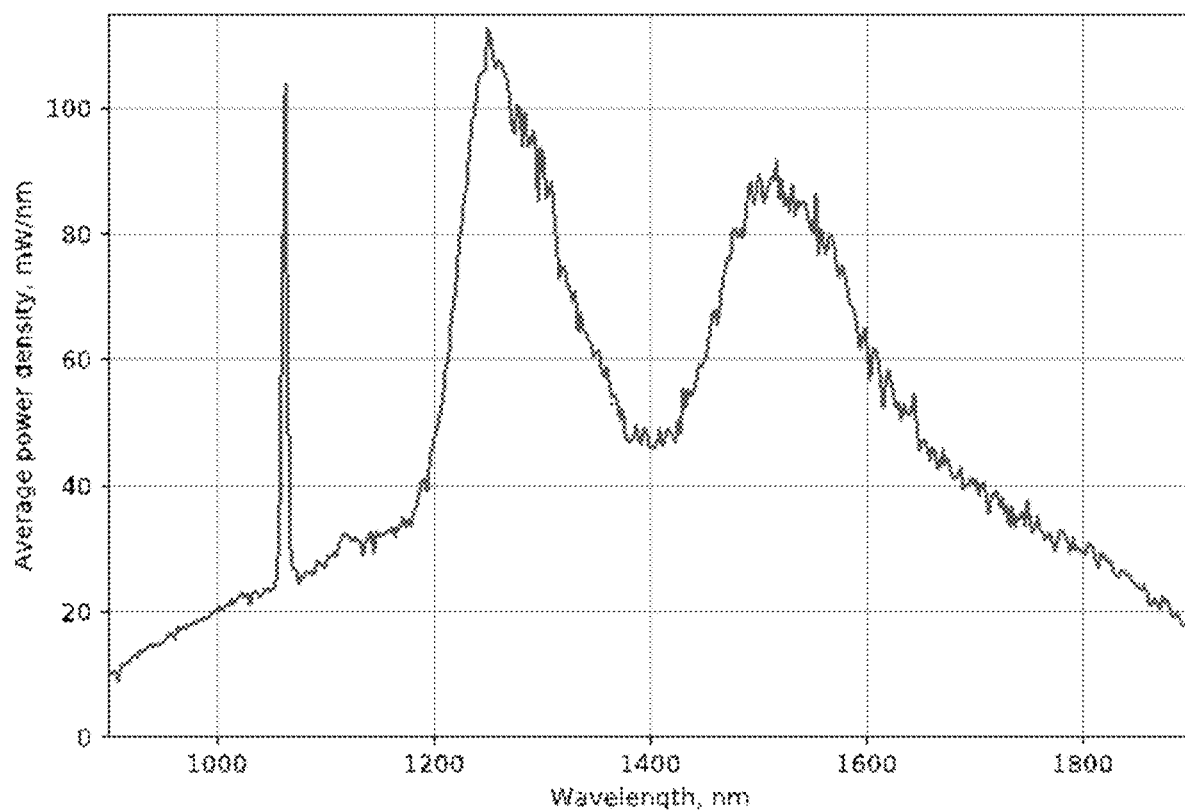
FIG. 5 depicts an example spectrum of an embodiment of the source of illumination provided with the HSI system.

The performance of the super continuum laser of the prototype of the active SWIR HSI system was tested in a laboratory. A power meter was used to measure total average output power output from the supercontinuum laser for a fixed PRF and pulse width. A spectrometer was used to measure power output as function of wavelength. FIG. 5 shows the average output power as a function of wavelength for the supercontinuum laser of the prototype of the active SWIR HSI system having a PRF of 500 kHz and pulse width of 40 ns. In various embodiments, the supercontinuum laser can be configured to output a pulse train having pulses with a pulse width in a range between about 0.5 ns and about 100 ns. The frequency of the pulse train can have a value in a range between 50 kHz and 5 MHz. Values outside these ranges are also possible.

The super continuum laser has reduced power in wavelengths around approximately 1.4 micron. Wavelengths around 1.4 micron are absorbed by atmosphere to a larger extent than other wavelengths and accordingly having reduced energy output from the SCL can be a more efficient design. Conversely, having higher output power for wavelengths between about 1.0 micron and about 1.2 micron may be more advantageous. Additionally, various embodiments of the super continuum laser can be configured to have lower power in wavelengths to which the human eye is sensitive to meet eye safety requirements or for use for more discrete purposes. In various embodiments, intensity of light output from the SCL can be brighter than the solar intensity in a spectral range between 1.0 micron and about 1.3 micron and/or between 1.5 micron and about 1.8 micron.

The signal-to-noise ratio (SNR) of received reflected light illuminated by a laser beam emitted from an optical source having a light output spectrum as shown in FIG. 5 was calculated using mathematical model. For wavelengths between about 1.2 micron and about 1.3 micron and between about 1.5 micron and about 1.7 micron where the average output power was greater than about 60 W/μm, the SNR of the received reflected light was calculated to be greater than about 50 dB. The calculated SNR is greater than the calculated SNR for received reflected light when the scene is illuminated by sunlight alone.

Laboratory Experiments

Figure 6:
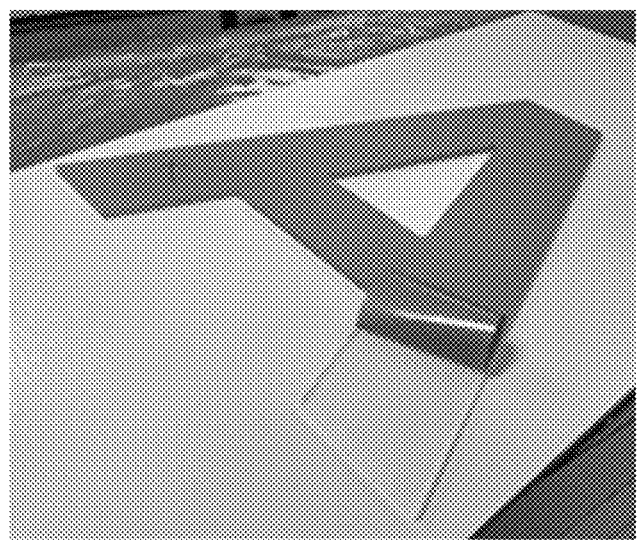
FIG. 6 shown an embodiment of a target comprising a clear acrylic letter on a painted target board that can be is used to test an embodiment of the HSI system comprising a source of illumination.
Figure 7:
FIG. 7 is an image of the target shown in FIG. 6 detected using an embodiment of the HSI system.

To evaluate the performance of the active SWIR HSI system in a lab, simple target boards were created from clear acrylic letters and painted plywood panels. Acrylic is chosen for its SWIR transmission features. A target board is developed to spell out "SAP" as shown in FIG. 6. FIG. 7 displays false color imagery of the target board generated from the active SWIR HSI data.

What is claimed is:

1. A hyperspectral imaging system comprising:
a supercontinuum laser source, wherein the supercontinuum laser source has sufficient output optical power such that the hyperspectral imaging system is configured to collect information associated with one or more objects located at a distance between 1 and 20 km from the hyperspectral imaging system, wherein the supercontinuum laser source has a first scan speed in a first direction and a second scan speed in a second direction that is slower than the first scan speed in the first direction, and wherein a light output of the supercontinuum laser source has a spot size that is thinner in the first direction than in the second direction;
transmit optics configured to propagate light output from the supercontinuum laser source along a transmit path towards the one or more objects in a scene;
a spectrometer configured to receive light from the one or more objects in the scene; and
electronics configured to generate a spectral image based on light received from said spectrometer.

2. The hyperspectral imaging system of claim 1, configured to resolve objects located at different distances from the imaging system using received-pulse delay detection and range gating.

3. The hyperspectral imaging system of claim 1, wherein the supercontinuum laser source comprises a seed optical source and an optical non-linear medium.

4. The hyperspectral imaging system of claim 1, wherein the supercontinuum laser source is configured to output light in the near-infrared wavelength region.

5. The hyperspectral imaging system of claim 1, wherein the supercontinuum laser source is configured to output light in a wavelength range between about 1 micron and about 1.8 micron.

6. The hyperspectral imaging system of claim 1, wherein the supercontinuum laser source is configured to output light in at least 90% of the wavelengths in the wavelength range between about 1 micron and about 1.8 micron.

7. The hyperspectral imaging system of claim 1, wherein the average optical power of the light output from the supercontinuum laser source is between about 40 W and about 400 W.

8. The hyperspectral imaging system of claim 1, wherein the average optical power of the light output from the supercontinuum laser source in a wavelength region between about 1.0 micron and about 1.8 micron is between 40 W and 400 W.

9. The hyperspectral imaging system of claim 3, wherein said seed optical source comprises a pulsed laser and optical pulses output by the pulsed laser have a pulse width in a range between 0.5 ns and about 100 ns.

10. The hyperspectral imaging system of claim 3, wherein said seed optical source comprises a pulsed laser and optical pulses output by the pulsed laser have a pulse rate frequency in a range between 50 kHz and 5 MHz.

11. The hyperspectral imaging system of claim 1, wherein said transmit optics comprise a focusing optical element.

12. The hyperspectral imaging system of claim 1, further comprising a scanning system configured to scan the light output from the supercontinuum laser source across the scene.

13. The hyperspectral imaging system of claim 1, further comprising receive optics configured to propagate light received from the one or more objects in the scene along a receive path towards the spectrometer.

14. The hyperspectral imaging system of claim 13, wherein the receive optics comprises at least collimating optics, focusing optics, or both.

15. The hyperspectral imaging system of claim 1, wherein said spectrometer comprises one or more prisms having wavelength dispersion for wavelengths of the light output by said supercontinuum light source and reflected from the one or more objects.

16. The hyperspectral imaging system of claim 1, further comprising an array of photodetectors disposed to receive light from said spectrometer, different photodetectors configured to receive light in different respective wavebands from the spectrometer.

17. The hyperspectral imaging system of claim 1, further comprising a receive path directing light received from said one or more objects in said scene to the spectrometer, wherein said transmit path and said receive path are at least partially co-aligned.

18. The hyperspectral imaging system of claim 1, wherein the supercontinuum laser source is bore-sighted with the spectrometer.

19. The hyperspectral imaging system of claim 1, wherein the supercontinuum laser source has an irradiance brighter than sunlight in a wavelength range between about 1.0 micron and about 1.4 micron.

20. The hyperspectral imaging system of claim 1, wherein the supercontinuum laser source has an irradiance brighter than sunlight in a wavelength range between about 1.4 micron and about 1.8 micron.

21. The hyperspectral imaging system of claim 1, wherein the one or more objects are located at a distance between 1 km and 4 km.

22. The hyperspectral imaging system of claim 1, wherein the one or more objects are located at a distance between 2 km and 8 km.

23. The hyperspectral imaging system of claim 1, wherein the light output is elliptical.

24. The hyperspectral imaging system of claim 1, wherein a lateral dimension of the light output from said supercontinuum laser at a distance between about 1 km and about 20 km is between about 0.1 m and about 1.0 m.

* * * * *